United States Patent
Shao et al.

(10) Patent No.: US 11,048,020 B2
(45) Date of Patent: Jun. 29, 2021

(54) METHOD OF REAL-TIME MEASURING VERTICAL PROFILES OF MULTIPLE ATMOSPHERIC PARAMETERS CARRIED BY AEROSTAT

(71) Applicant: HEFEI INSTITUTE OF PHYSICAL SCIENCE, CHINESE ACADEMY OF SCIENCES, Hefei (CN)

(72) Inventors: Shiyong Shao, Hefei (CN); Yong Han, Hefei (CN); Zongbo Shi, Hefei (CN); Daming Yu, Hefei (CN); Wenyue Zhu, Hefei (CN); Xuebin Li, Hefei (CN)

(73) Assignee: HEFEI INSTITUTE OF PHYSICAL SCIENCE, CHINESE ACADEMY OF SCHIENCES, Hefei (CN)

( * ) Notice: Subject to any disclaimer, the term of this patent is extended or adjusted under 35 U.S.C. 154(b) by 587 days.

(21) Appl. No.: 16/062,310

(22) PCT Filed: Apr. 28, 2017

(86) PCT No.: PCT/CN2017/082556
§ 371 (c)(1),
(2) Date: Jun. 14, 2018

(87) PCT Pub. No.: WO2018/152962
PCT Pub. Date: Aug. 30, 2018

(65) Prior Publication Data
US 2020/0278475 A1    Sep. 3, 2020

(30) Foreign Application Priority Data
Feb. 27, 2017   (CN) .......................... 201710106171.6

(51) Int. Cl.
*G01W 1/10*   (2006.01)
*G01W 1/08*   (2006.01)
*G01W 1/11*   (2006.01)

(52) U.S. Cl.
CPC ................ *G01W 1/10* (2013.01); *G01W 1/08* (2013.01); *G01W 1/11* (2013.01)

(58) Field of Classification Search
CPC ............ G01W 1/10; G01W 1/08; G01W 1/11
See application file for complete search history.

(56) References Cited

U.S. PATENT DOCUMENTS

2015/0295646 A1* 10/2015 Clemmensen ......... H04B 10/11
                                                              398/125

FOREIGN PATENT DOCUMENTS

CN        101702037          5/2010
CN        101702037 A   *   5/2010
(Continued)

OTHER PUBLICATIONS

International Search Report filed in PCT/CN2017/082556 dated Feb. 27, 2017.

*Primary Examiner* — Son T Le
*Assistant Examiner* — Nana Owusu Ansah
(74) *Attorney, Agent, or Firm* — Rankin, Hill & Clark LLP (57) ABSTRACT

The present invention discloses a method of simultaneously acquiring vertical profiles of multiple atmospheric parameters. Measuring devices based on multiple principles and capable of measuring multiple parameters simultaneously are fixed on a cable of an aerostat at specified distance decided by measurement task, each measuring device finishes measuring the atmospheric parameters at its altitude thereof, and transmits data to a ground data acquisition and processing device in real time, so as to synchronously acquire the real-time measured profiles of multiple atmospheric parameters. The profile data does not have any assumption, and standard data can be provided to a ground remote sensing device like radar for measuring at the same place while regular meteorological parameters and atmo- (Continued)

spheric contamination data are provided to atmospheric and environmental governance departments.

8 Claims, 6 Drawing Sheets

(56) References Cited

FOREIGN PATENT DOCUMENTS

| | | | |
|---|---|---|---|
| CN | 104192316 | | 12/2014 |
| CN | 205139117 | | 4/2016 |
| CN | 205139117 U | * | 4/2016 |
| CN | 105717068 | | 6/2016 |
| JP | 2003205897 | | 7/2003 |

* cited by examiner

METHOD OF REAL-TIME MEASURING VERTICAL PROFILES OF MULTIPLE ATMOSPHERIC PARAMETERS CARRIED BY AEROSTAT

TECHNICAL FIELD

The present invention relates to a new method of acquiring vertical profiles of multiple atmospheric parameters (including meteorological, contaminant and optical parameters), which synchronously measures the atmospheric parameters at the position where measuring devices are located through the arrangement of the measuring devices in a vertical direction, and provides standard data for an inversion result of a radar, a satellite and other remote sensing devices while realizing real-time measurement to the vertical profiles of multiple parameters.

BACKGROUND

Atmospheric parameter sounding is a necessary input parameter and a reference for atmosphere and environmental protection departments to master the atmospheric conditions, conduct atmosphere and air quality forecasting and formulate corresponding emergency control strategies. With the increasing emphasis on environmental governance in China, the measurement methods of the atmospheric parameters, including the release of sounding balloons, and the construction of meteorological towers, radar remote sensing, and meteorological satellites, face many problems that need to be solved urgently.

The release of the sounding balloons is a traditional technology for acquiring the vertical profiles of the atmospheric parameters, and is still a common technology used in atmospheric measurement today, which plays an important role in the development of meteorology and weather forecasting. The sounding balloon has small investment, low cost, long flight time, stable attitude of carrying instruments, high accuracy of observation data, and great flexibility, and is not affected by territory and weather factors when releasing. Currently, the sounding balloons are still commonly used as calibration equipment for other detection instruments. The sounding balloon is used as a carrier to carry a sounding instrument to the sky, During the rising process, the sounding instrument measures the temperature, air pressure, air humidity, wind and other meteorological data of different altitudes, longitudes and latitudes, then transmits the meteorological data to the ground by wireless signals, so as to acquire airborne meteorological element values. The sounding balloon can reach tens of kilometers away from the ground; but limited by the flight speed thereof, it spends one or more hours usually for the sounding balloon to acquire a complete profile, and the real-time performance is poor. During the rising time of the sounding balloon, the meteorological parameters of lower-layer space passed by the sounding balloon may have undergone major changes. Moreover, due to the influence of wind, the sounding balloon may have deviated from the vertical space above the release site.

The measuring devices are arranged on the meteorological tower to realize the vertical measurement of the parameters, which is also commonly used in meteorology. For example, a 325 m meteorological observation tower in the Institute of Atmospheric Physics, Chinese Academy of Sciences, mainly serves the study of air pollution in capital Beijing, the studies of atmospheric boundary layer and atmospheric turbulent diffusion, etc. The meteorological tower currently and mainly has two sets of observing systems: a 15-layer atmospheric gradient observing system and a 7-layer turbulence flux observing system. The atmospheric gradient observing system started to conduct regular observation of meteorological factors from 1979, including wind speed, wind direction, temperature and humidity. The turbulence system has also been used for observation for many years, and the observation contents include three-dimensional wind speed, moisture, carbon dioxide, air pressure, etc. The observation data from the two sets of systems accumulated for many years has been widely applied in the study field of atmospheric sciences. However, the construction cost of the meteorological tower is very high, the measurement altitude of the meteorological tower is limited by the altitude of a cramp iron, and once the meteorological tower is constructed, only the position where the meteorological tower is located can be observed, and the meteorological tower does not have mobility. A meteorological radar is a special radar used for atmospheric detection, which belongs to an active microwave atmospheric remote sensing device, and is used for detecting the vertical distribution of parameters including wind, atmospheric turbulence and atmospheric stability in the clear air. The rapid development of a laser radar provides powerful means for the study of the vertical distribution of $SO_2$, $NO_2$, particulate matters and other contaminants. A radar technology realizes real-time acquisition of measured parameters, Radar has an ideal measurement altitude, and can be arranged at site to be measured and vehicle-mounted measurement. However, both the meteorological radar and the laser radar have assumptions, which always face a variety of challenges in the actual measurement process, and the error is quite large sometimes.

Satellite is the quickest and most effective means to acquire the atmosphere information of large regions or whole world. For example, MODIS has 36 channels, and channels 31 and 32 are used in the inversion of the temperature of ground surface, but various inversions of the satellites have assumptions. In actual measurement, the prerequisite often deviate from the assumptions, and the resolution of the satellite is usually about 1000 m or more. The data is too rough and the guiding significance to the local atmospheric information is rapidly weakened.

In conclusion, in order to adapt to new trends of meteorological and atmospheric pollution detection, it is necessary to research a removable new vertical profile measurement method with a long measurement cycle and no assumptions; on the basis of overcoming the defects of the meteorological tower, the sounding balloon, the satellite remote sensing and other technologies, a stable and reliable acquisition of multiple atmospheric parameters is formed.

SUMMARY

The object of the present invention is directed to meteorological parameters and important atmospheric pollution components, and to simultaneously obtain multiple atmospheric parameters at the altitudes where measuring devices are regularly located along a cable of an aerostat, wherein the combinations of the atmospheric parameters of all altitudes form vertical profiles of multiple parameters. The present invention provides a new method of acquiring vertical profiles of multiple atmospheric parameters in real time, and meanwhile, provides a calibration data without a hypothetical premise for satellite, ground-based radar, and other remote sensing measuring devices under the same atmospheric condition.

The technical solution adopted in the present invention is as follows.

A new method of real-time measuring vertical profiles of multiple atmospheric parameters carried by an aerostat is characterized in that a plurality of multi-parameter measuring devices with the same performances distributed vertically and carried by an ball and cable of aerostat at predetermined distance are used to simultaneously measure multiple meteorological parameters at different altitudes from ground to the ball height, and the measurement data of each measuring device is transmitted to a ground receiving and processing device by wireless, so as to obtain online vertical profiles of the meteorological parameters.

Further, the aerostat system comprises an aerostat balloon, an attitude adjuster is arranged above the aerostat balloon, a high-voltage cable carried with the multi-parameter measuring device is connected below the aerostat balloon, the other end of the high-voltage cable is twined on a cable twister, the plurality of multi-parameter measuring devices are installed on the high-voltage cable on an operating platform in sequence at predetermined distance. The predetermined distance is set according to the requirement on the accuracy and altitude of the parameter put forward by a task on the premise of considering the carrying capacity of the aerostat, the general principle of setting is that the distribution distance of the device is longer when the device is farther away from the ground. The multi-parameter measuring devices subsequently rise to a predetermined altitude with the aerostat balloon, each multi-parameter measuring device obtains multiple meteorological parameters of the altitude thereof, the combination of each meteorological parameter along the altitude forms the vertical profile of the parameter, and the combinations of multiple meteorological parameters along the altitudes form the vertical profiles of multiple atmospheric parameters.

Further, the operating platform is provided with a transmission track, whose tail end is equipped with a manipulator, an electrical switched limiting hole is arranged over the operating platform through a support, and a fixed pulley is arranged below the operating platform through the support, the high-voltage cable is limited to the position of the manipulator through the electrical-switched limiting hole and the fixed pulley, and is tightened and vertical, and the multi-parameter measuring devices are transmitted by the transmission track and fixed on the limited high-voltage cable by the manipulator at predetermined distance.

Further, the cable twister, the electrical-switched limiting hole, the transmission track and the manipulator are all controlled by a controlling and data processing system, the controlling and data processing system conducts coordinate controlling according to the predetermined distance between the multi-parameter measuring devices, in the process that the multi-parameter measuring devices are loaded to the high-voltage cable, the rising speed of the cable is determined by the controlling and data processing system through the cable twister of the aerostat, and the working states of the manipulator, the track and the limiting hole are controlled and implemented by a sequential control program of the controlling and data processing system according to the speed of the cable twister.

Preferably, the aerostat system, the operating platform and the controlling and data processing system can be placed on a carrier vehicle to realize mobile measurement.

Preferably, a fixed snap ring is arranged in the back of the multi-parameter measuring device, and the multi-parameter measuring device is fixed on the cable of the aerostat through the manipulator.

Preferably, the surface of the light power transmission line for multi-parameter measuring device is coated by magnetic materials, and can be automatically pasted on the high-voltage cable of the aerostat under a power-on state, and when the multi-parameter measuring device is taken down, the light power transmission line automatically falls off due to the power outage of the high-voltage cable.

The multi-parameter measuring device is powered by a light power transmission line connected to a mains supply, and the mains supply controls the working state of the multi-parameter measuring device; the surface of the light power transmission line is coated by magnetic materials, and can be automatically pasted on the high-voltage cable of the aerostat under a power-on state, and when the multi-parameter measuring device is taken down, the light power transmission line automatically falls off due to the power outage of the high-voltage cable.

Preferably, In actual application, the quantity and suspending distance of the multi-parameter measuring devices are determined by the actual needs and the carrying capacity of the aerostat, the measuring data enters the ground receiving device through a wireless module, so as to provide calibration data for the radar and other remote sensing devices while forming the vertical profiles of multiple parameters.

The creation points of the present invention are as follows.
1. The vertical profiles of multiple parameters are acquired in real time;
2. The acquiring process of the vertical profiles data does not have any assumptions;
3. The measuring altitude can be controlled manually, and the quantity and interval of the measuring devices can be adjusted and controlled according needs; and
4. The aerostat and the measuring devices carried by the aerostat are placed on the carrier vehicle, and belong to a mobile measuring system.

BRIEF DESCRIPTION OF DRAWINGS

FIG. 5 illustrates measured data of profiles of multiple parameters in a meteorological field, wherein the data is acquired by the existing devices. The object of displaying the data is to provide a proof for the multiple parameters of the meteorological field, and the existing devices are integrated to be carried on the cable of the aerostat, so that the real-time acquisition of the data of the profiles of multiple parameters of the meteorological field can be realized. The regular meteorological parameters of humidity, temperature, wind speed, wind direction, atmospheric pressure, and the refractive index structure constant in FIG. 5 are realized by a sounding balloon carrying with an automatic meteorological station and a temperature oscillometer, the concentration profiles of nitrogen dioxide, carbon dioxide and ozone are acquired by the sounding balloon carrying with a electrochemical sensor, the altitudes shown by (g), (h) and (i) in the drawing are effective detecting altitudes, the detecting data thereof forms comparison, and the drawing shows the profiles with little error compared with radar data.

FIG. 5 (a) is a diagram of real-time measured vertical profile of the humidity of the regular meteorological parameter; it can be seen from the drawing that with the rising of the altitude, the humidity shows a decreasing trend in whole, a relatively thick cloud layer exists at the altitude ranging from about 3000 m to 4000 m, which is the position where an inflection point of the humidity appears;

FIG. 5 (b) is a diagram of real-time measured vertical profile of the temperature of the regular meteorological parameter, the temperature shows a decreasing trend in whole below 10 km, and the inflection point appears nearby the top of a troposphere;

FIG. 5 (c) is a diagram of real-time measured vertical profile of the wind speed of the regular meteorological parameter, the change rule of the wind speed is complicated, and shows an "S" shape in whole, and the maximum value appears at the position of 12-13 km;

FIG. 5 (d) is a diagram of real-time measured vertical profile of the wind direction of the regular meteorological parameter, the wind direction is defined as 0 degree in a north direction, the angle is increased in sequence according to a clockwise direction, and the direction shown in the drawing is mainly the west wind;

FIG. 5 (e) is a diagram of real-time measured vertical profile of the atmospheric pressure of the regular meteorological parameter, the atmospheric pressure shows obvious exponential distribution with the altitude, and has the simplest rule in all parameters;

FIG. 5 (f) is a diagram of real-time measured vertical profile of the refractive index structure constant of the regular meteorological parameter, the refractive index structure constant is decreased in whole with the rising of the altitude, but the amplitude has a relatively large vibration;

FIG. 5 (g) is a diagram of real-time measured vertical profile of the nitrogen dioxide concentration of the atmospheric pollutant, the nitrogen dioxide concentration is decreased in whole with the rising of altitude, but the change at different time is obvious;

FIG. 5 (h) is a diagram of real-time measured vertical profile of the sulfur dioxide concentration of the atmospheric pollutant, and the rule of the value is similar to that of nitrogen dioxide; and FIG. 5 (i) is a diagram of real-time measured vertical profile of the ozone concentration of the atmospheric pollutant, and the rule of the value is similar to those of nitrogen dioxide and sulfur dioxide.

DETAILED DESCRIPTION

The technical solution of the present invention is described in detail hereinafter through detailed embodiments.

Figure 1:
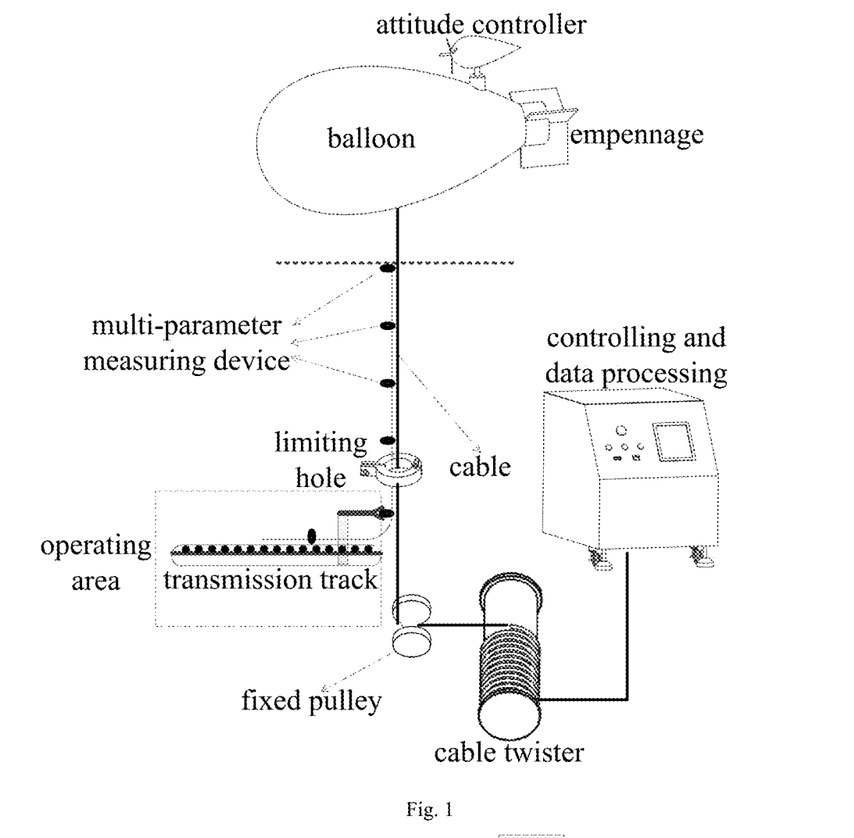
FIG. 1 is a schematic diagram of a new method of real-time measuring vertical profiles of multiple atmospheric parameters carried by an aerostat.

In the embodiment, as shown in FIG. 1, a new method of real-time measuring vertical profiles of multiple atmospheric parameters carried by an aerostat is provided, a plurality of multi-parameter measuring devices with the same performances distributed vertically and carried by an aerostat system at predetermined distance are used to simultaneously measure multiple meteorological field parameters at different altitudes respectively, and the measurement data of the measuring devices is transmitted to a ground receiving device by wireless, so as to obtain the vertical profiles of the meteorological parameters with the altitudes in real time.

The multi-parameter measuring device can be assembled by using existing devices according to the requirement of measuring parameters.

Further, the aerostat system comprises an aerostat balloon, an attitude adjuster arranged above the aerostat balloon, a high-voltage cable carried with the multi-parameter measuring device connected below the aerostat balloon, the other end of the high-voltage cable twined on a cable twister. The plurality of multi-parameter measuring devices are installed on the high-voltage cable on an operating platform in sequence at predetermined distance, and the multi-parameter measuring devices subsequently rise to a predetermined altitude with the aerostat balloon. The attitude adjuster on the aerostat balloon adjusts the attitude of the aerostat balloon, so that the high-voltage cable is maintained vertical in working to enable the plurality of multi-parameter measuring devices carried thereon to be vertically distributed. Each multi-parameter measuring device obtains multiple meteorological parameters of the altitude thereof, the combination of each meteorological parameter along the altitude forms the vertical profile of the parameter, and the combinations of multiple meteorological parameters along the altitudes form the vertical profiles of multiple atmospheric parameters. The predetermined distance is set according to the requirement on the accuracy and altitude of the parameter defined by the task on the premise of considering the carrying capacity of the aerostat, and a general setting principle is that the distribution distance among the devices is longer when the devices are farther away from the ground. The predetermined altitude is determined according to the requirement on the accuracy and altitude of the parameter put forward by the task, if the altitude required by the task exceeds the length of the high-voltage cable of the aerostat, the altitude is implemented according to the length of the maximum high-voltage cable of the aerostat.

Further, the operating platform is provided with a transmission track, whose tail end is equipped with a manipulator. An electrical switched limiting hole is arranged over the operating platform, and a fixed pulley is arranged below the operating platform, the high-voltage cable is limited to the position of the manipulator through the electrical-switched limiting hole and the fixed pulley, and is tightened and vertical, so as to prevent the cable from swinging to separate from the effect scope of the manipulator under the effect of the wind speed, and the multi-parameter measuring devices are transmitted by the transmission track and are fixed on the limited high-voltage cable by the manipulator at predetermined distance.

Further, the cable twister, the electrical switched limiting hole, the transmission track and the manipulator are all controlled by a controlling and data processing system, the controlling and data processing system conducts coordinate controlling according to the predetermined distance between the multi-parameter measuring devices, in the process that the multi-parameter measuring devices are loaded to the high-voltage cable, the rising speed of the cable is determined by the controlling and data processing system through the cable twister of the aerostat, and the working states of the manipulator, the track and the limiting hole are controlled and implemented by a sequential control program of the controlling and data processing system according to the speed of the cable twister.

The aerostat system, the operating platform and the controlling and data processing system can be placed on a carrier vehicle to realize mobile measurement.

A fixed snap ring is arranged in the back of the multi-parameter measuring device, and the multi-parameter measuring device is fixed on the cable of the aerostat through the manipulator.

The multi-parameter measuring device is powered by a light power transmission line connected to a mains supply, and the mains supply controls the working state of the multi-parameter measuring device; the surface of the light power transmission line is coated by magnetic materials, and can be automatically pasted on the high-voltage cable of the aerostat under a power-on state, and when the multi-parameter measuring device is taken down, the light power transmission line automatically falls off due to the power outage of the high-voltage cable.

In an embodiment, the parameters of the multi-parameter measuring device comprise but are not limited to any one or a combination of several of regular meteorological parameter, atmospheric pollutant concentration, the number concentration of aerosol particles, scale spectrum, superficial area concentration, volume concentration, complex refractive index and refractive index structure constant.

Wherein, the regular meteorological parameter comprises but is not limited to temperature, humidity, atmospheric pressure, wind speed and wind direction.

The atmospheric contaminant comprises but is not limited to nitrogen dioxide, carbon monoxide, volatile organism, sulfur dioxide, ozone and carbon black.

In the actual operating process, the suspending quantity and distance of the multi-parameter measuring device are determined according to the task requirement and the carrying capacity of the aerostat, the measuring data enters the ground receiving device through a wireless mode, so as to provide the rating data for the radar and other remote sensing devices while forming the vertical profiles of multiple parameters.

The theoretical foundations of the measurement for wind speed, wind direction, atmospheric refractive index structure constant, the concentration of atmospheric pollutant, the complex refractive index and the number concentration of aerosol particles in the use of the present invention are further introduced hereinafter.

(1) Measurement of Wind Speed and Wind Direction

A convertor array is composed of three ultrasonic converters at equal distance on the same level, and the time of the ultrasonic wave transmitted from one converter to another two converters is measured to determine the wind speed and the wind direction. A wind sensor measures triple-way bi-directional transmission time formed along the convertor array, the transmission time depends on the wind speed along the ultrasonic way, when the wind speed is zero, the transmission times of forward direction and reverse direction are the same, and when the wind direction is in the same direction as the sound way, the transmission time of upwind direction becomes long, and the transmission time of downwind direction becomes short. The wind speed is calculated according to the transmission time acquired by using the following formula:

$$V_w = 0.5 \times L \times (1/t_f - 1/t_r) \quad (1)$$

Wherein, $V_w$, L, $t_f$ and $t_r$ are respectively the wind speed, the distance between two converters, the transmission time of forward direction, and the transmission time of reverse direction.

The wind speed of each way in the ultrasonic way is calculated through measuring six transmission times. The wind direction is calculated by using the wind speed of the array way, the north refers to 0°, the east refers to 90°, the south refers to 180° and the west refers to 270°.

(2) Measurement of Atmospheric Refractive Index Structure Constant

The fluctuation character of a turbulence refractive index field is usually researched through measuring the fluctuation character of a turbulence temperature field, which is also the most common and effective means of researching local atmospheric turbulence optical property currently. The relation between the refractive index structure constant $C_n^2$ and the temperature structure constant $C_T^2$ is as follows:

$$C_n^2 = \left(79\frac{P}{T^2}\right)^2 C_T^2 \times 10^{-12} \quad (2)$$

Wherein, P refers to atmospheric pressure and T refers to absolute temperature. Assuming that the turbulence temperature field meets Kolomogrov hypothesis, the temperature structure constant in an inertial area meets the following condition:

$$\langle [T(r_1+r) - T(r_1)]^2 \rangle = C_T^2 r^{2/3} \quad (3)$$

Wherein, r is the distance between two measuring points, T(r) is the temperature value of the measuring point, according to formula (3), the time change of temperature difference of the two points in the inertial area is measured and averaged when sample number is designed big enough in unit time, so as to obtain the temperature structure constant, and then obtain the refractive index structure constant.

The temperature of the position located thereof can be acquired through measuring the resistance of a platinum wire:

$$R_T = R_{ref}[1 + \alpha(T - T_{ref})] \quad (4)$$

Wherein, $R_T$ is the resistance of the platinum wire under the temperature T, $R_{ref}$ is the resistance of the platinum wire under the reference temperature $T_{ref}$, and $\alpha$ is a temperature coefficient. In the temperature scope of [0, 100° C.], the resistance value of the platinum wire has a very good linear relation with the temperature, wherein $T_{ref} = 0°$ C. and $\alpha = 3.85 \times 10^{-3}$ °C.$^{-1}$.

Figure 2:
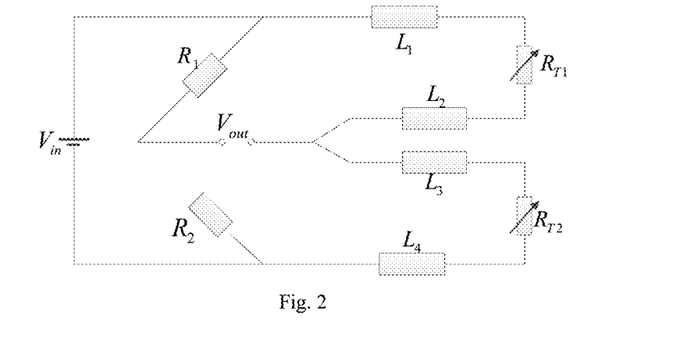
FIG. 2 is a schematic diagram of four-way-wire double-resistor temperature detector for measuring the temperature difference of two points.

Two resistance temperature detectors are placed at two arms of an electrical bridge, as shown in FIG. 2, if the resistance $R_1 = R_2$ the effective resistance of the wire is $L_1 = L_2 = L_3 = L_4 = L$, and then:

$$V_{out} = \frac{R_{T2} - R_{T1}}{2(R_{T1} + R_{T2} + 4L)} V_{in} \quad (5)$$

$R_{T2}$ and $R_{T1}$ are respectively the resistances of the platinum wires at two positions, under the condition that the resistance and the input voltage $V_{in}$ are known, the temperature difference between the two points can be acquired according to $V_{out}$, and the accuracy of 0.001° C. can be acquired generally.

(3) Measurement of the Concentration of Atmospheric Pollutant

TABLE 1

Electrochemical Processes of Several Common Pollution Gases

| Pollution gas | Reaction process |
|---|---|
| $NH_3$ | $4NH_3 \rightarrow 3NH_4^+ + 1/2N_{2(g)} + 3e$ |
| $SO_2$ | $SO_2 + e \rightarrow SO_2^-$ |
| $NO_2$ | $NO_2 \rightarrow NO_2^+ + e$ |

Figure 3:
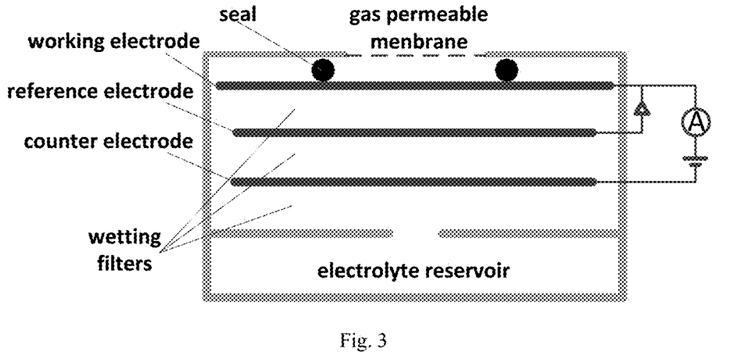
FIG. 3 is a schematic diagram of an electrochemical measuring device.

The electrochemical sensor detects the targeted gas through measuring the electric current, and the accuracy can reach the magnitude of parts per billion (PPB). The electrode of the electrochemical sensor comprises three parts of an electrode, a reference electrode and a counting electrode mutually separated by a filtering layer, and electrolyte passes through the filtering layer through the capillary action to form the electric charge flow between the electrodes. The surface of a sensing electrode is usually coated with special catalyst to provide larger surface area, so as to accelerate the catalyst of the gas to be measured. The sensing electrode reacts with the gas to be measured, and electron charge is generated on the surface of the sensing electrode. The reaction processes of several common pollution gases are shown in Table 1. Through redox reaction, the electric charge generated by the sensing electrode is balanced by the counting electrode, so as to form a redox couple of the chemical reaction. The electric current caused by electron transfer is in direct proportion to the concentration of the gas to be detected, so as to realize the detection to the gas to be detected, and the schematic diagram is shown in FIG. 3.

(4) Measurement of the Complex Refractive Index and the Concentration of Aerosol Particles When an aerosol particle passes through a beam of laser, partial light can be scattered, and the number concentration of particle can be detected through counting the pulse count reaching the scattering light of the detector. Since the light scattering strength of the particle has a certain relation with the particle size of the particle, the particle size of each particle can be estimated through the scattering light, so as to obtain the surface area concentration and the volume concentration.

Figure 4:
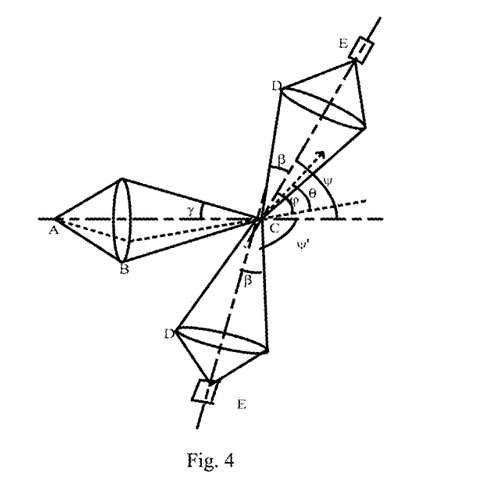
FIG. 4 is a schematic diagram of double-angle optical particle counter, wherein A refers to light source, B refers to illuminating lens, C refers to scattering particles, D refers to receiving lens and E refers to a photomultiplier.
Figure 5A:
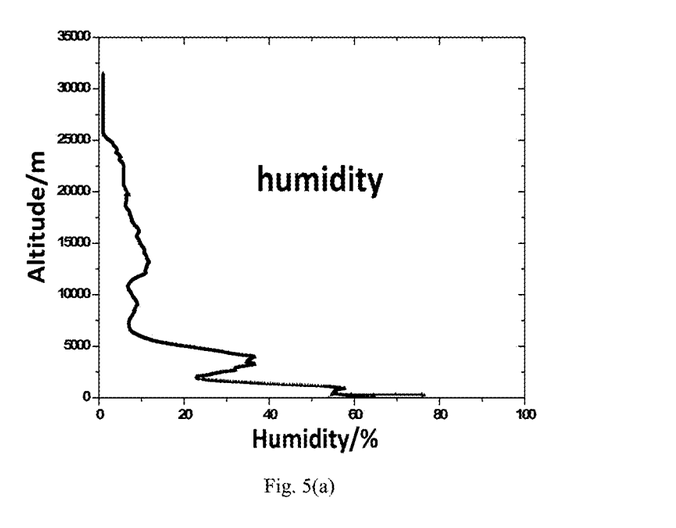
Figure 5B:
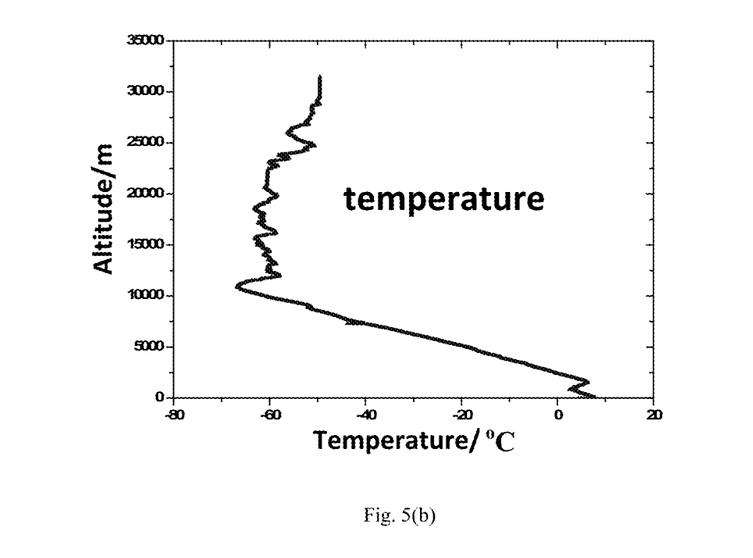
Figure 5C:
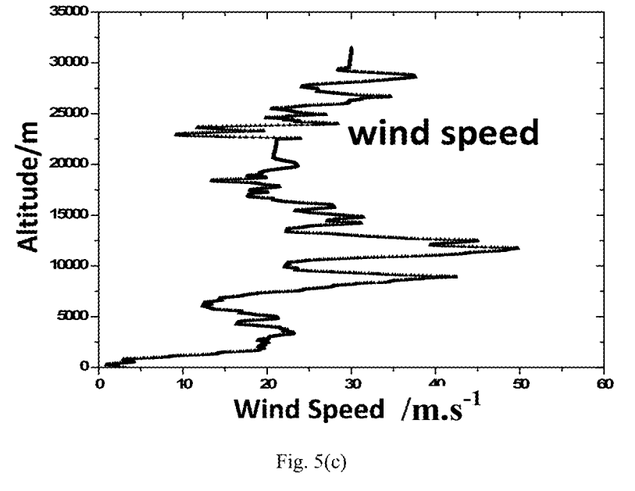
Figure 5D:
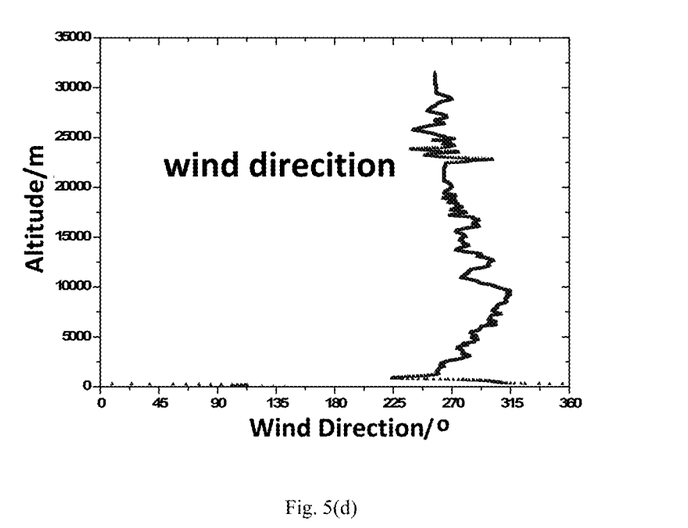
Figure 5E:
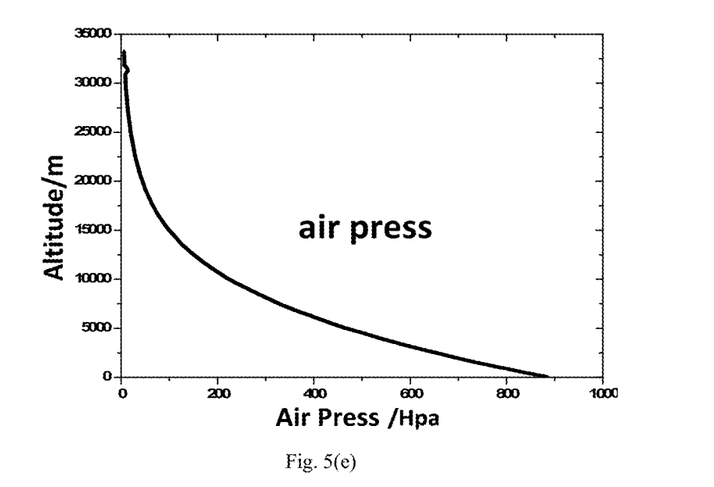
Figure 5F:
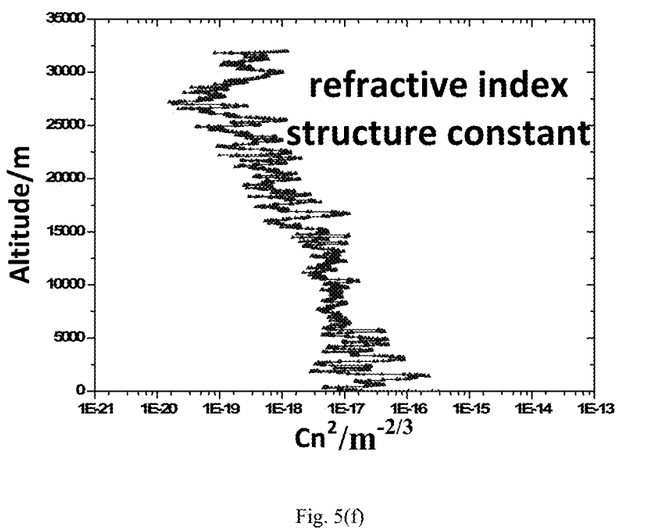
Figure 5G:
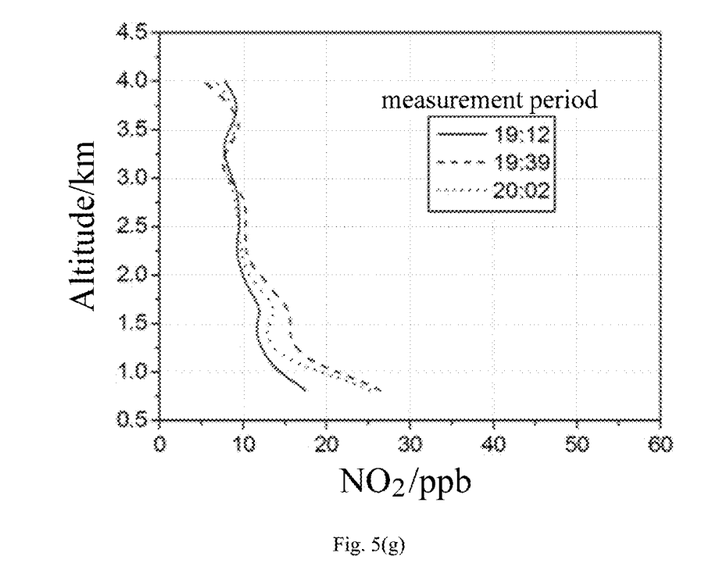
Figure 5H:
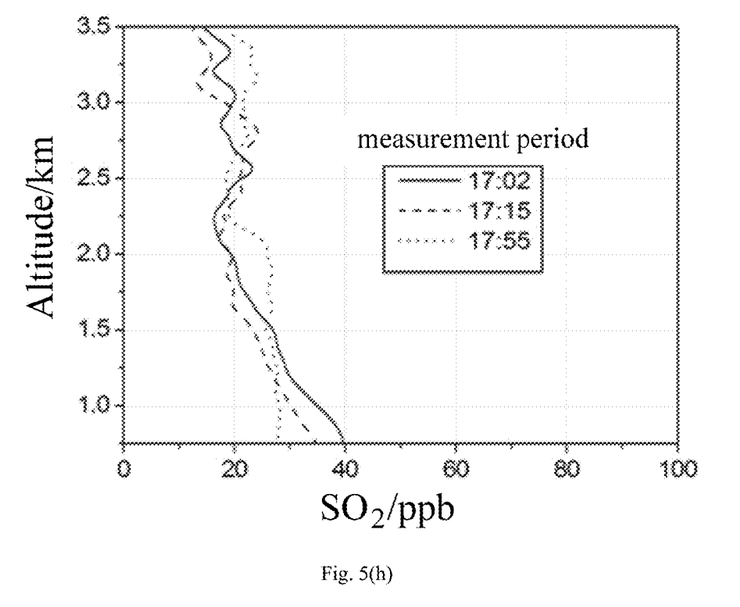
Figure 5I:
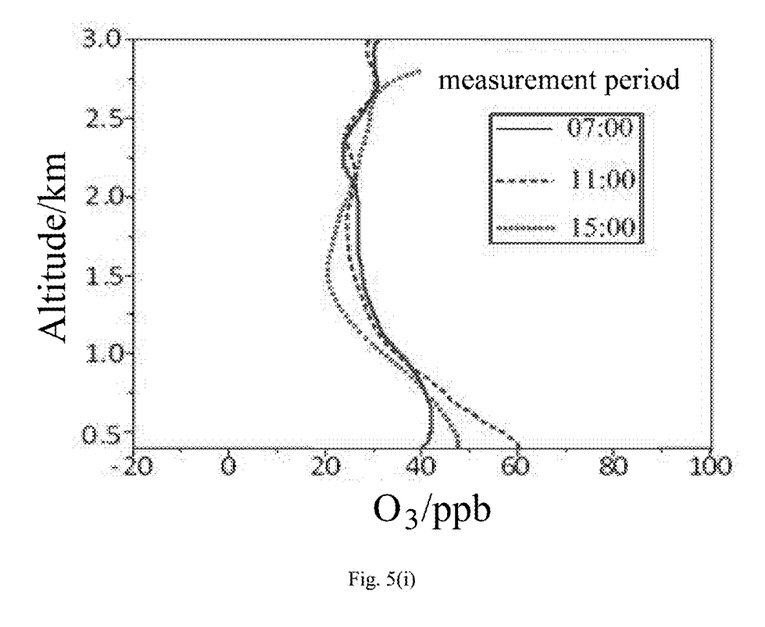

The schematic diagram of a double-scattering angle optical particle counter is shown in FIG. 4. The double-scattering angle optical particle counter measures the angle scattering strength of single particle transiting a focusing light area in a scattering chamber, and a photoelectric detection element converts the particle into voltage pulse of a certain altitude. A response curve of the voltage pulse strength and the particle size is sensitive to the complex refractive index of the particle m ($m=n_r-jn_i$, $n_r$ and $n_i$ are real parts and virtual parts of the refractive index). In order to calculate the refractive index more effectively, two best scattering angles shall meet three conditions: (a) the response amounts on the two scattering angles are very sensitive to the refractive index; (b) the response amounts on the two scattering angles cannot be linearly dependent. That is, the ratio of the response amounts of two scattering angle systems shall change with the change of the refractive index, which is also the physical basis of inverting the refractive index; (c) the selection to the scattering angle shall consider the multi valuedness of the curve and the strength of a scattering signal.

Since the real part of the refractive index has relatively little effect, only the effect of the virtual part is discussed here. In order to describe the sensitive degree of the response amount to the refractive index, a sensitivity function $f_i(\alpha, \theta, m)$ of the virtual part is defined as follows:

$$f_i(\alpha, \theta, m) = \left| \frac{1}{R} \frac{\partial R}{\partial n_i} \right| \tag{6}$$

In the formula above, $\alpha$ is the scattering response amount of the particle with the refractive index of m and the radius of r when R is an extinction coefficient:

$$R(r, m) = \int_{\psi-\gamma}^{\psi+\gamma} \int_{\phi-\beta}^{\phi+\beta} \frac{\lambda^2}{8\pi^2} (i_1 + i_2) \cdot S(\lambda) \cdot F(\theta, \phi) \cdot d\theta d\phi \tag{7}$$

In the formula, $\gamma$ and $\beta$ are respectively a half of illuminating lens and a half of receiving lens, $\psi$ is an intersected angle of the illuminating and receiving lenses, $\theta$ is a scattering angle variable, $\phi$ is an included angle variable of convergent incident light with a receiving lens axis, $S(\lambda)$ is the spectral sensitivity of a photomultiplier receiving the scattering light, and $F(\theta,\phi)$ is a geometrical factor. Since laser light source has good directionality without needing a convergent lens, and only the receiving lens is needed, so that $\gamma=0$, and the corresponding $F(\theta,\phi)$ is as follows:

$$F(\theta, \phi) = 2\sin\theta \cdot \arccos\left( \frac{\cos\beta - \cos\theta\cos\phi}{\sin\theta\sin\phi} \right) \tag{8}$$

The two angles maximally and minimally affected by the refractive index are determined by using the sensitivity function, the quantity of the particle acquired near by the angle minimally affected by the refractive index is N, the quantity of multiple particles that can be acquired near by the angle maximally affected by the refractive index according to different virtual parts is $N_i$, when $N_i=N$, the corresponding virtual part is the virtual part of the refractive index, and then the complex refractive index of the aerosol particle is acquired with the real part of the refractive index.

After the measurement values of the parameters at all altitudes are acquired, a sequence is formed according to the altitudes, so as to form altitude profiles of multiple atmospheric parameters, which is shown as following Table 2.

TABLE 2

Array Table of Vertical Profiles of Multiple Parameters

| | Altitude 1 | Altitude 2 | Altitude 3 | ... Altitude n | Altitude profile |
|---|---|---|---|---|---|
| Parameter 1 | $(x_1, h_1)$ | $(x_1, h_2)$ | $(x_1, h_3)$ | ... $(x_1, h_n)$ | Altitude profile of parameter 1 |
| Parameter 2 | $(x_2, h_1)$ | $(x_2, h_2)$ | $(x_2, h_3)$ | ... $(x_2, h_n)$ | Altitude profile of parameter 2 |
| Parameter 3 | $(x_3, h_1)$ | $(x_3, h_2)$ | $(x_3, h_3)$ | ... $(x_3, h_n)$ | Altitude profile of parameter 3 |
| ... | ... | ... | ... | ... ... | ... |
| Parameter m | $(x_m, h_1)$ | $(x_m, h_2)$ | $(x_m, h_3)$ | ... $(x_m, h_n)$ | Altitude profile of parameter m |

The specific operating processes of the preset invention are as follows.
1. The quantity of the multi-parameter measuring devices is determined according to the requirement on the accuracy and altitude of the parameter put forward by the task, the multi-parameter measuring device is calibrated on the ground to ensure response characteristics of all devices keep consistent in the error scope;
2. The vehicle carrying control and the data processing system are started at predetermined site, the aerostat sphere and accessory equipment are place, and the operation area of the cable, the multi-parameter measuring device and the transmission track are distributed;
3. After appropriate amount of helium is filled in the aerostat balloon, the balloon is released according to predetermined average speed through the cable twister, and meanwhile, the multi-parameter measuring device is fixed on the cable in the operation area through the manipulator under the control of a timing sequence program;
4. After the aerostat balloon rises to the appointed altitude, the works of the cable twister, the transmission track and the manipulator are synergistically stopped;
5. The multi-parameter measuring devices of all altitudes transmit the atmospheric parameter of their corresponding positions located thereof to the ground acquisition and processing device through a wireless mode; and
6. The acquired array data of the atmospheric parameters and the altitude are integrated to form the vertical profiles of multiple atmospheric parameters.

The regular meteorological parameters comprising temperature, humidity, wind speed, wind direction and atmospheric pressure, the atmospheric refractive index structure constant and several common pollution gases are measured in the embodiment, the vertical profiles thereof are respectively acquired, the measurement results are respectively shown in FIGS. 5(a), 5(b), 5(c), 5(d), 5(e), 5(f), 5(g), 5(h) and 5(i), and the real-time measurement to the vertical profiles of multiple atmospheric parameters is realized.

The invention claimed is:

1. A method of real-time measuring vertical profiles of multiple atmospheric parameters carried by an aerostat, wherein a plurality of multi-parameter measuring devices with the same performances distributed vertically and carried by an aerostat balloon and cable at a predetermined distance are used to simultaneously measure multiple meteorological parameters at different altitudes, and measurement data of each measuring device is wirelessly transmitted to a ground receiving and processing device, so as to obtain the vertical profiles of the meteorological parameters with the altitudes in real time,
wherein an aerostat system comprises the aerostat balloon, an attitude adjuster is arranged above the aerostat balloon, a high-voltage cable carried with the multi-parameter measuring device is connected below the aerostat balloon, the other end of the high-voltage cable is twined on a cable twister, the plurality of multi-parameter measuring devices are installed on the high-voltage cable on an operating platform in sequence at the predetermined distance, the multi-parameter measuring devices subsequently rise to a predetermined altitude with the aerostat balloon, each multi-parameter measuring device obtains multiple meteorological parameters of the altitude thereof, combination of each meteorological parameter along the altitude forms the vertical profile of the parameter, and the combinations of multiple meteorological parameters along the altitudes form the vertical profiles of the multiple atmospheric parameters,
wherein the operating platform is provided with a transmission track whose tail end is equipped with a manipulator, an electrical switched limiting hole is arranged over the operating platform through a support and a fixed pulley is arranged below the operating platform through the support, the high-voltage cable is limited to the position of the manipulator through the electrical-switched limiting hole and the fixed pulley, and is tightened and vertical, and the multi-parameter measuring devices are transmitted by the transmission track and fixed on the limited high-voltage cable by the manipulator at the predetermined distance.

2. The method of real-time measuring vertical profiles of multiple atmospheric parameters carried by an aerostat according to claim 1, wherein the cable twister, the electrical-switched limiting hole, the transmission track and the manipulator are all controlled by a controlling and data processing system, and the controlling and data processing system coordinately controls the cable twister, the electrical-switched limiting hole, the transmission track and the manipulator according to the distance between the multi-parameter measuring devices.

3. The method of real-time measuring vertical profiles of multiple atmospheric parameters carried by an aerostat according to claim 1, wherein the aerostat system, the operating platform and the controlling and data processing system are placed on a carrier vehicle to realize mobile measurement.

4. The method of real-time measuring vertical profiles of multiple atmospheric parameters carried by an aerostat according to claim 1, wherein a fixed snap ring is arranged in the back of each multi-parameter measuring device, and the multi-parameter measuring device is fixed on the cable of the aerostat through the manipulator.

5. The method of real-time measuring vertical profiles of multiple atmospheric parameters carried by an aerostat according to claim 1, wherein the parameters of the multi-parameter measuring device comprise any one or a combination of several of a regular meteorological parameter, atmospheric pollutant concentration, number concentration of aerosol particles, scale spectrum, superficial area concentration, volume concentration, complex refractive index and refractive index structure constant.

6. The method of real-time measuring vertical profiles of multiple atmospheric parameters carried by an aerostat according to claim 5, wherein the regular meteorological parameter comprises any one or a combination of several of temperature, humidity, atmospheric pressure, wind speed and wind direction.

7. The method of real-time measuring vertical profiles of multiple atmospheric parameters carried by an aerostat according to claim 5, wherein the atmospheric contaminant comprises any one or a combination of several of nitrogen dioxide, carbon monoxide, volatile organism, sulfur dioxide, ozone and carbon black.

8. A method of real-time measuring vertical profiles of multiple atmospheric parameters carried by an aerostat, wherein a plurality of multi-parameter measuring devices with the same performances distributed vertically and carried by an aerostat balloon and cable at a predetermined distance are used to simultaneously measure multiple meteorological parameters at different altitudes, and measurement data of each measuring device is wirelessly transmitted to a ground receiving and processing device, so as to obtain the vertical profiles of the meteorological parameters with the altitudes in real time, wherein each multi-parameter measuring device is powered by a light power transmission line connected to a mains supply, and the mains supply controls the working state of each multi-parameter measuring device; the surface of the light power transmission line is coated by magnetic materials, and is configured to automatically pasted on the high-voltage cable of the aerostat under a power-on state, and when each multi-parameter measuring device is taken down, the respective light power transmission line automatically falls off due to the power outage of the high-voltage cable.

* * * * *